United States Patent

[11] 3,550,671

| [72] | Inventor | Richard F. Harvey<br>Pittsburgh, Pa. |
|---|---|---|
| [21] | Appl. No. | 619,053 |
| [22] | Filed | Feb. 27, 1967 |
| [45] | Patented | Dec. 29, 1970 |
| [73] | Assignee | Metaltronics<br>Orchard Lake, Mich.<br>a corporation of Pennsylvania |

[54] STEELMAKING PRACTICE
2 Claims, 1 Drawing Fig.

[52] U.S. Cl. ................................................. 164/52,
75/10, 164/82, 164/252
[51] Int. Cl. .................................................. B22d 27/02
[50] Field of Search ........................................ 75/10;
164/52, 82, 252, 281, 282, 283

[56] References Cited
UNITED STATES PATENTS

| 3,067,473 | 12/1962 | Hopkins | 75/10X |
|---|---|---|---|
| 3,072,982 | 1/1963 | Gordon | 75/10X |
| 3,152,372 | 10/1964 | Hopkins | 75/10X |
| 3,234,608 | 2/1966 | Peras | 75/10X |

FOREIGN PATENTS

| 854,176 | 11/1960 | Great Britain | 164/252 |
|---|---|---|---|

Primary Examiner—J. Spencer Overholser
Assistant Examiner—John E. Roethel
Attorney—Buell, Blenko & Ziesenkeim ABSTRACT: An improved process of making steel is provided which consists in forming an electrode of substantially uniform cross section by continuous casting, and thereafter remelting the electrode in a consumable electrode-melting process.

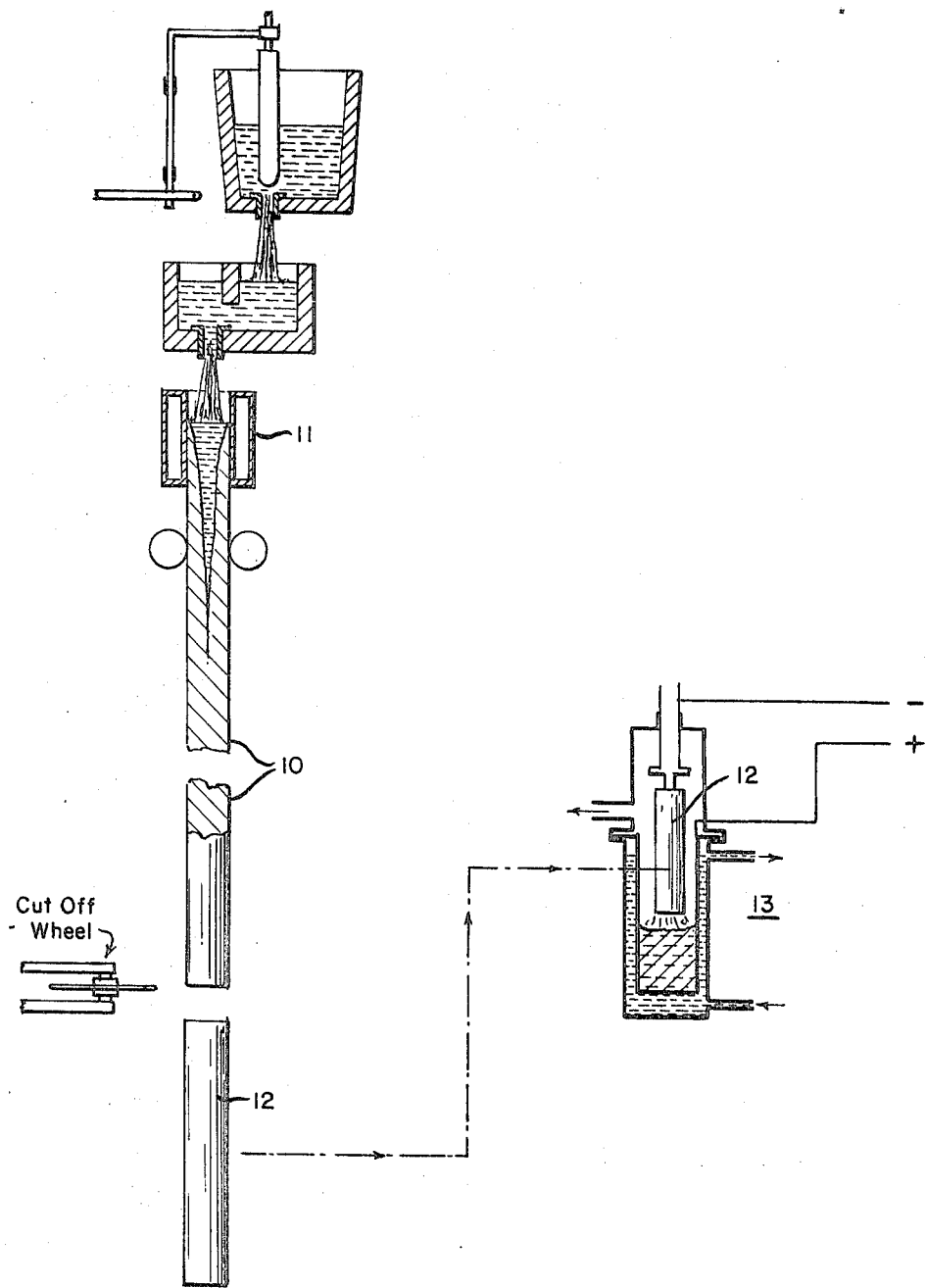

STEELMAKING PRACTICE

This invention relates to an improved steelmaking process which results in high quality with very substantial economies in the melting of steels and alloys for tool applications as well as for other critical applications such as in the field of high temperature, high strength, and corrosion resistance. Briefly, this new process combines the economies and production advantages of the continuous casting process with the high quality standards attainable by the consumable electrode arc melting process to result in a new steelmaking procedure with important advantages and economies not heretofore attainable.

In the consumable electrode arc-melting method, a round ingot is cast in a round mold usually from air-melted steel. This round ingot is stripped from the mold and is used as an electrode in a consumable electrode arc furnace wherein an arc is struck to melt or consume the electrode to form a remelted ingot. The process is basically similar to an arc welding process and the melting is done in a water cooled copper jacket or mold.

Melting may be done in a vacuum in which case the process is referred to as consumable electrode vacuum arc melting or the melting may be done in air or under a slag.

The advantages of consumable electrode vacuum arc melting are recognized by metallurgists and engineers. In this connection several examples of the improvement in quality which may be expected are tabulated on Page 523 of the Eighth Edition of the Metals Handbook published by the American Society for Metals, Copyright 1961, Metals Park, Ohio 44073.

However, there are two major deficiencies in consumable electrode arc melting which the present invention is specifically designed to correct with important advantages in economy not heretofore attainable by the practice of prior art steelmaking procedures.

In the consumable arc-remelting process the raw material is generally a round electrode which is air melted in an arc furnace and it is cast in a round mold. Roughly at least about 2 inches of taper is required in the round mold in order to facilitate stripping the round ingot from the mold. This taper is a source of difficulty and error on subsequent consumable electrode arc remelting as the electrode diameter is not constant but varies in diameter along its entire length. This changes the arc conditions and results in variations in the rate and type of arc deposit. Metallurgists and engineers concerned with consumable arc remelting recognize this deficiency in the process and many electrodes are turned or ground at considerable expense to provide an electrode of constant diameter. The use of electrodes which vary in diameter along their length introduces an unnecessary source of error and uncertainty which precludes accurate control of the melting process and results in quality problems in the steels which this invention is specifically designed to correct.

As will be explained more fully hereinafter, the present method of steel melting avoids the difficulties with electrodes of varying diameter which is characteristic of conventional steel-making practice and this is accomplished very readily and at a marked reduction in cost.

Another factor which contributes to the high cost of consumable arc remelting is that the electrodes which are cast in round molds have to be cropped to remove the hot top. This is done to remove the "piped" condition which exists in the hot top and to some extent in the top portion of the ingot. Cropping results in a loss in yield of about 15 to 20 percent which very substantially increases the cost of consumable arc remelting.

As will be explained more fully hereinafter the present method of steelmaking avoids the crop loss of about 15 to 20 which is characteristic of the conventional method of making electrodes for consumable arc melting.

It is a further object of this invention to provide a new steelmaking process for the production of high quality steels at an overall cost which is substantially less than present methods.

It is a further object of this invention to provide for improvements in the quality of consumable arc remelted steel.

These and other objects may be obtained by the teachings of the present invention.

My investigations show that improvements in quality with very substantial economies can be made by continuously casting the electrodes instead of casting in molds. Briefly, the continuous casting process for electrodes is defined as a casting technique in which the electrode is continuously solidified while it is being poured so that its length is not determined by mold dimensions. Basically this involves pouring the molten metal into a tundish from which it flows into a water-cooled copper mold. The level of molten metal in the tundish and the rate of flow of the molten metal through the mold is carefully controlled to provide for uniform and desirable solidification conditions.

As the metal strand emerges from the mold it is generally water cooled and its rate of travel is controlled by a set of pinch rolls.

One of the difficulties with continuous casting is that the process cannot produce alloy steels and steels for critical applications due in large measure to poor centers. Center segregation and porosity are a characteristic weakness. However, I find the process to be very satisfactory for the casting of round electrodes which are subsequently remelted by the arc consumable process. While the quality of continuous casting is not sufficiently good in high alloy steels to be used directly, it does serve very well for the production of electrodes which will be remelted. For this purpose I find that the speed of casting can be increased to increase production. Basically all that is required of the electrode is that it be of the proper size and composition and that it be capable of conducting a current.

My improved process consists broadly in first casting a circular electrode by continuous casting means and secondly remelting the continuously cast electrode by a consumable electrode arc-remelting process. The remelting of the electrode by the consumable arc process may be carried out by fastening a current carrying electrode clamp to the continuously cast electrode to feed current to the electrode and controllably to move the electrode to produce desired arc characteristics for remelting the said electrode.

More specifically my process consists in first, heating a steel of desired analysis to a point above its melting temperature to render it liquid; second, pouring the molten metal by a continuous solidification process into a round water-cooled mold while withdrawing the solidified circular metal strand by means of pinch rolls which control the speed of said metal as it emerges from said mold; third, cutting the solidified metal strand to length to provide a continuously cast electrode for consumable electrode arc remelting; fourth, remelting said electrode in a consumable electrode melting furnace to produce a remelted ingot.

The accompanying schematic drawing illustrates the practice of my invention.

An electrode 10 is formed by continuous casting in a conventional continuous casting system 11 as shown in FIG. 1 of Peras, U.S. Pat. No. 3,234,608. The continuous cast electrode 10 is cut into electrode segments 12 by a cutoff saw or other conventional cutoff means. The separate electrode segments 12 are then used as the electrode in a consumable electrode system 13 as shown at page 545 of "The Making, Shaping and Treating of Steel," Eighth Edition, United States Steel Corp. Pittsburgh, Pennsylvania.

An additional advantage for the new method of electrode preparation is that with a continuously cast, constant diameter electrode made in accordance with the principles of this invention, a consumable electrode current carrying clamp can be simply designed to contact the virgin surface of the continuously cast ingot. This device will eliminate the otherwise substantial cost of attaching electrode shanks to the top of the electrode to facilitate connection to the support ram in the consumable furnace.

The economies and improvements attainable by the practice of this invention will be apparent from the following example:

EXAMPLE 1

A.I.S.I. M2 high-speed steel 3 1/16 inches rd. barstock is compared for cost and yield by the practice of this invention with the cost and yield characteristic of conventional practice as follows:

TYPE ANALYSIS

|  | Percent |
|---|---|
| Carbon | 1.00/1.05 |
| Manganese | .20/.35 |
| Silicon | .20/.40 |
| Molybdenum | 5.00/5.75 |
| Tungsten | 6.00/6.75 |
| Chromium | 4.00/4.50 |
| Vanadium | 1.85/2.15 |

The balance being iron plus trace elements in normal amounts.

A. CONVENTIONAL PRACTICE
(Basis 10,000 lbs. melted)

| | |
|---|---|
| Air melt (arc) 10,000 lbs. (35.5¢/lb.) 18 inch ingots | $3,550.00 |
| Press cogg to 6 in. sq. billets and cropp hot top 6,800 lbs. (9¢/lb.) | 612.00 |
| Grind and inspect billets 6,300 lbs. (2¢/lb.) | 126.00 |
| Roll to 3½ in. rd., anneal 5,800 lbs. (10¢/lb.) | 580.00 |
| Cut ends, turn to 3⅛ in. rd. 5,300 lbs. (3¢/lb.) | 159.00 |
| Grind to 3 3/16 in. rd. inspect 5,000 lbs. (8¢/lb.) | 400.00 |
| Total cost | $5,427.00 |
| Selling price 5,000 lbs. at $1,365/lb | $6,825.00 |
| Gross profit (excluding cost of sales) | $1,398.00 |

B. IMPROVED PRACTICE
(Basis 10,000 lbs. melted)

| | |
|---|---|
| Continuous cast 9 in. rd. 10,000 lbs. (28.8¢/lb.) | $2,880.00 |
| Cut to length (½¢/lb.) | 50.00 |
| Consumable arc remelt to 12 in. rd. 9,850 lbs. (5.2¢/lb.) based on operation of 3 furnaces | 512.20 |
| Press cogg to 6 in. sq. 9,350 lbs. (5¢/lb.) | 467.50 |
| Grind and inspect 9,050 lbs. (2¢/lb.) | 181.00 |
| Roll to 3½ in. rd., anneal 8,700 lbs. (10¢/lb.) | 870.00 |
| Cut ends, turn to 3⅜ in. rd. 8,250 lbs. (3¢/lb.) | 247.50 |
| Grind to 3⅛ in. rd. inspect 8,000 lbs. (8¢/lb.) | 640.00 |
| Total cost | $5,848.20 |
| Selling price 8,000 lbs. at $1.365/lb | 10,920.00 |
| Gross profit (excluding cost of sales) | 5,071.80 |

In the example shown A.I.S.I. M2 high-speed steel made by the practice of this invention may be expected to show a 3,000-pound improvement in yield and an increase in gross profit of $3,673.80 per 10,000 pounds melted.

This will be recognized by those skilled in the art as representing a very substantial reduction in the cost of producing quality steels.

While an example has been cited which illustrates the reduction in cost and the improvement in yield to be attained by the practice of this invention it will be understood that this invention may be otherwise embodied within the scope of the following claims:

I claim:

1. An improved steelmaking process for producing high alloy steels comprising the steps of:
   a. pouring a high alloy steel in the molten condition into a casting ladle;
   b. pouring the molten high alloy steel from said ladle into a cooled continuous casting mold;
   c. solidifying said molten metal at least partially in said mold while continuously withdrawing solidified steel from the bottom of said mold;
   d. cutting said solidified steel to lengths suitable for consumable electrode remelting;
   e. disposing said electrode steel in an arc remelting mold with the electrode of one polarity and the mold of opposite polarity;
   f. striking an arc between said electrode and mold and passing a current therethrough to progressively melt said electrode; and
   g. continuously melting and feeding the electrode downwardly to form an ingot of remelted sound steel.

2. The improved method of consumable electrode melting within an ingot mold having a mold cavity therein, which comprises, providing a high alloy metal electrode body cast by continuous casting means, disposing the said continuously cast electrode body within the said mold cavity with the electrode of one polarity and the mold of opposite polarity, applying electric current to the said electrode body, progressively arcing high alloy metal away from the electrode body within the said mold cavity by discharging the said electric current from the said electrode body to the mold, forming a molten high alloy metal bath from the fused metal of the said electrode body within the said mold cavity, and finally progressively consuming the said electrode body and solidifying the molten high alloy metal of the said bath upwardly within the said mold cavity to form a high alloy metal ingot.